United States Patent
Michael

[11] 3,894,447
[45] July 15, 1975

[54] FOUR-PINION DIFFERENTIAL

[75] Inventor: Richard Arlo Michael, Waterloo, Iowa

[73] Assignee: Deere & Company, Moline, Ill.

[22] Filed: Dec. 20, 1973

[21] Appl. No.: 426,915

[52] U.S. Cl. .................................. 74/713; 74/711
[51] Int. Cl. ........................... F16h 1/40; F16h 1/44
[58] Field of Search ......... 74/713, 710, 710.5, 711; 180/24.08, 24.09, 44 R; 192/35

[56] References Cited
UNITED STATES PATENTS

| 3,276,290 | 10/1966 | Randall | 74/711 |
| 3,437,186 | 4/1969 | Roper | 74/711 |
| 3,593,595 | 7/1971 | Taylor | 74/713 |
| 3,651,713 | 3/1972 | Mueller | 74/713 |
| 3,653,280 | 4/1972 | Koskela | 74/713 |

FOREIGN PATENTS OR APPLICATIONS

| 692,007 | 6/1940 | Germany | 74/713 |

Primary Examiner—Samuel Scott
Assistant Examiner—P. S. Lall

[57] ABSTRACT

A four-pinion differential featuring two pinion shafts disposed at ninety degrees to each other and intersecting at their midpoints, each shaft being continuous so as to span the differential housing diametrically thereof.

7 Claims, 5 Drawing Figures

PATENTED JUL 15 1975 3,894,447

SHEET 1

3,894,447

FOUR-PINION DIFFERENTIAL

BACKGROUND OF THE INVENTION

The conventional four-pinion differential normally contains a central spider in the form of a block or the like from which four pinion shafts radiate, each shaft journaling a pinion and in turn being mounted in the proximate portion of the differential casing or housing. A construction of this type requires that the differential housing be split in a plane radial to the main axis of rotation so that the two housing parts can be assembled in embracing relation to the shafts, each of four complementary parts of the two casing or housing parts being provided with matching semi-cylindrical recesses to accomodate the shafts.

In one known variation of the above, the differential housing need not be split, because one of the pinion shafts spans the housing walls diametrically and is carried at opposite ends in coaxial bores. This shaft carries centrally thereof a block having a pair of opposed tapped bores coaxial on an axis intersecting and at right angles to the one-piece shaft. The other two shafts are stub shafts passed respectively through housing wall bores on the axis of the tapped bores and each stub shaft has a reduced end portion externally threaded and screwed into its respective block bore. Such a construction is disclosed in U.S. Pat. No. 3,593,595.

Both of the above types of design are relatively expensive mainly because of the number of parts, the requirement for extra care in machining, assembly, etc.

SUMMARY OF THE INVENTION

According to the present invention, the construction is considerably simplified and the intersecting shafts eliminate the need for a split housing, thus enabling assembly of the pinions into the housing followed by insertion of the shafts. Since the shafts span the housing in intersecting diameters, complicated, threaded joints are avoided. This is achieved by providing a first shaft of one-piece construction having a substantially uniform diameter throughout and a second shaft of substantial diameter at one end but of reduced diameter from just inwardly beyond to its opposite end, the portion of reduced diameter passing through a cross bore in the center of the first shaft. Supplementing the second shaft at the terminal end of the reduced portion is a sleeve having an inside diameter fitting the reduced portion and an outside diameter fitting the proximate housing bore. Preferably, the sleeve, the first shaft and the larger portion of the second shaft have like diameters. A further feature is that a single securing means may be used to connect the housing to both the sleeve and the shaft portion within the sleeve. No additional means is required to secure the larger shaft because it is confined by the shoulder and inner end of the sleeve at opposite sides of the cross bore through the first or larger shaft.

DESCRIPTION OF THE PREFERRED EMBODIMENT

Figure 1:
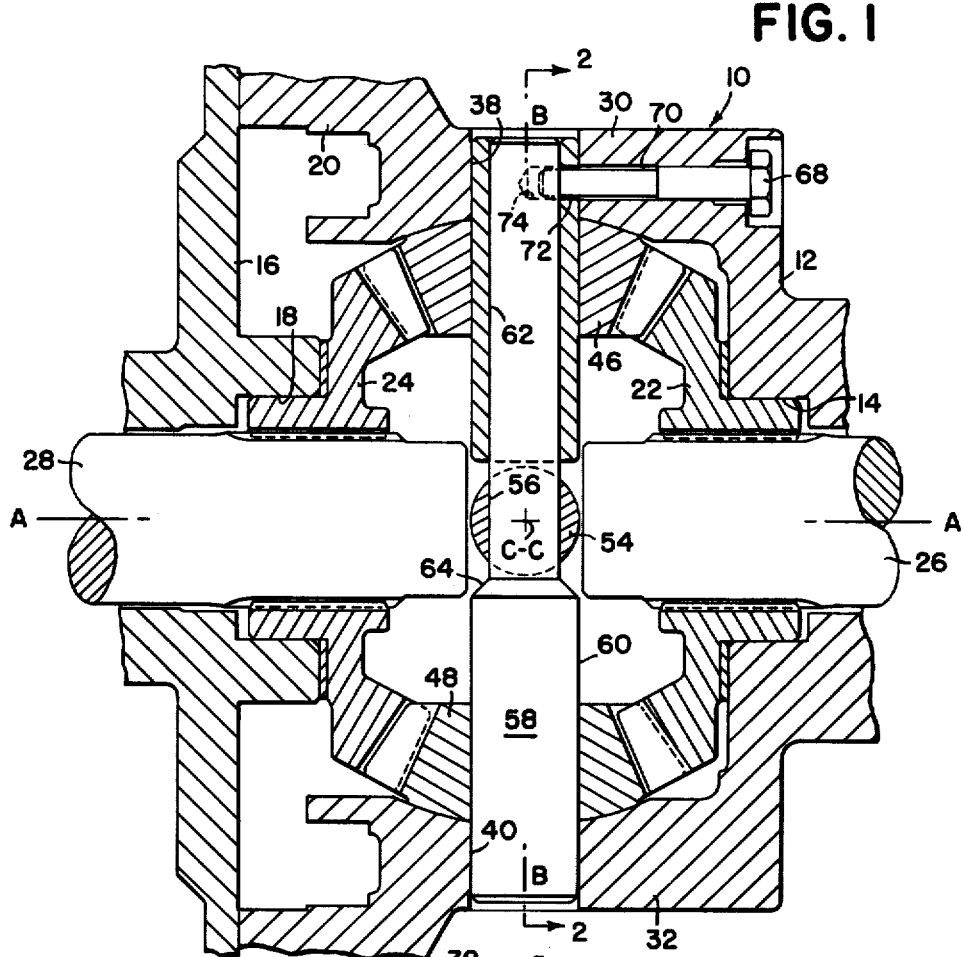
FIG. 1 is a cross section through a preferred form of construction on a plane through the main driving axis of the differential.

The numeral 10 designates a generally cup-shaped differential housing or casing, closed at one side by a radial wall 12 (except for an opening 14) and open at its other side; although, the open side is ultimately closed by a supplemental wall 16 having an opening 18 coaxial with the opening 14. An outer peripheral or annular housing wall 20 is integral with the wall 12 and extends axially across the assembly and abuts the opposite wall 16. Any suitable means (not shown) may be used to unite the cup-shaped housing and the wall 16.

Figure 2:
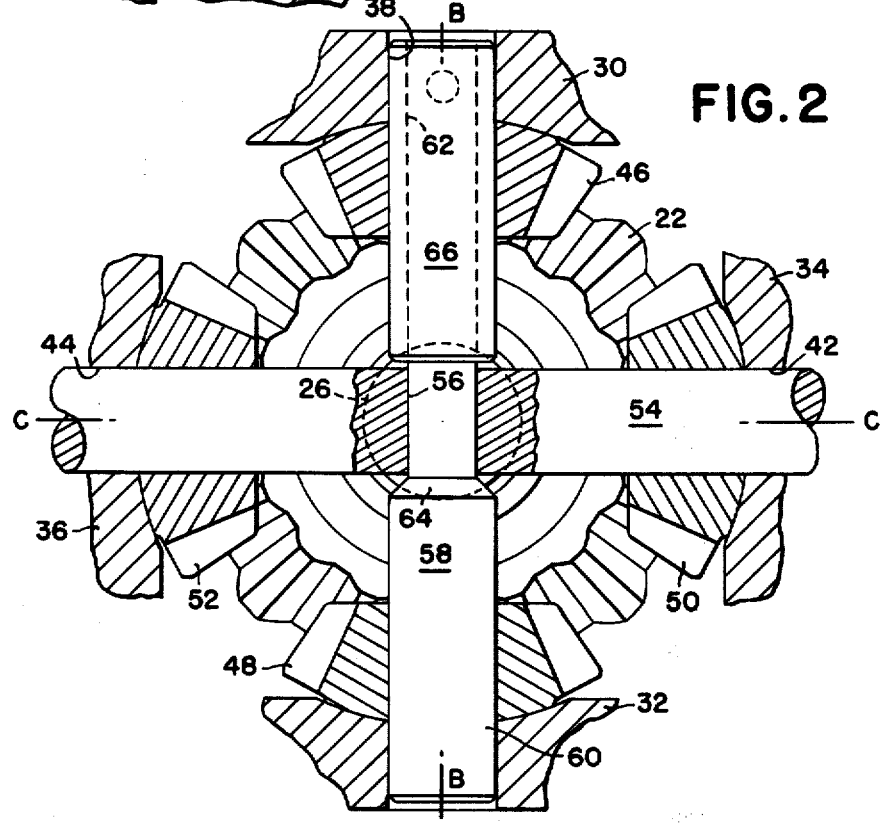
FIG. 2 is a fragmentary section on the line 2—2 of FIG. 1.
Figure 3:
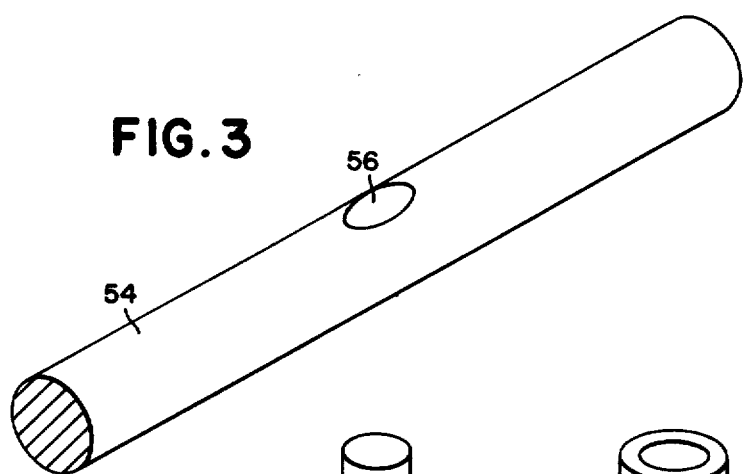
FIG. 3 is a perspective of the uniform-diameter shaft.
Figure 4:
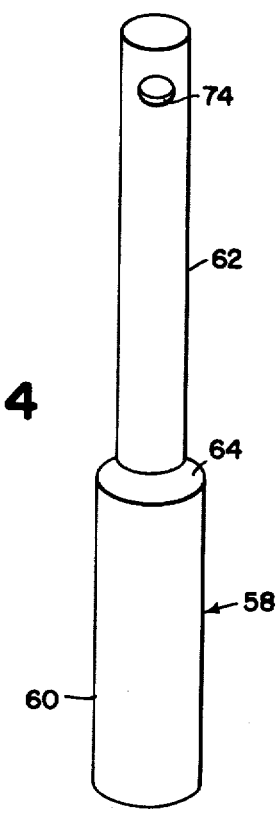
FIG. 4 is a perspective of the other shaft.
Figure 5:
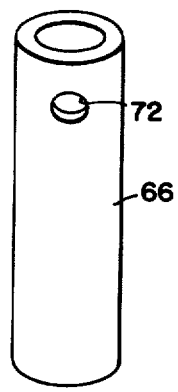
FIG. 5 is a perspective of the sleeve.

The openings 14 and 18 respectively journal the hubs of side gears 22 and 24 and these are in turn splined respectively to axles 26 and 28 coaxial on driving axis A—A. As best shown in FIG. 2, the housing 10 has four supporting portions 30, 32, 34 and 36 preferably integral parts of the annular wall 20, and these portions respectively have circular openings or bores 38, 40, 42 and 44, preferably of the same diameter. The bores 38 and 40 are coaxial on a pinion axis B—B; and the bores 42 and 44 are coaxial on another pinion axis C—C that is at right angles to the axis B—B and that intersects both axes A—A and B—B.

Four pinions 46, 48, 50 and 52 are carried within the housing 10, one pair lying on the axis B—B and other pair lying on the axis C—C. The pinions 50–52 may be regarded as a first pair journaled respectively adjacent opposite ends of a first pinion shaft 54 which has its opposite terminal ends carried respectively in the housing bores 42 and 44. The shaft 54 is provided at its center with a cross bore or opening 56.

The second pair of pinions 46 and 48 lie on the axis B—B and are carried respectively adjacent ends of a second pinion shaft 58 of special construction, particularly by having a minor part of its length of, preferably, the same diameter as the shaft 54, as at 60, and a major part of its length, as at 62, of reduced diameter. An annular shoulder 64 occurs, of course, at the junction of the portions 60 and 62. The larger portion 60 journals the pinion 48 and fits into the bore 40 and the reduced portion passes through the cross bore 56 in the shaft and then through a sleeve 66 which in turn passes through the pinion 46 and into the housing bore 38, where it is secured by fastening means preferably comprising a cap screw 68 threaded into a tapped bore 70 in the housing 10 and going through a bore 72 in the sleeve 66 and then entering a recess or blind bore 74 in the reduced portion 62 of the pinion shaft 58.

Since the pinion shaft 54 is confined by the pinion shaft 58 as the reduced shaft portion 62 passes through the cross bore 56 in the shaft 54, the latter needs no securing means and that just described serves to retain both shafts.

As will be seen, the construction is exceptionally simple. Primarily it does away with the need for a split housing, since the shafts 54 and 58 can be readily inserted from outside the housing and through their respective pinions, the pinions 50 and 52 being first installed in the open-sided housing 10 (the wall 16 not being assembled yet) and the shaft 54 inserted across the housing and through these pinions. The other two pinions are placed within the housing and the shaft 58 passes across from outside the housing, going first through the pinion 48, then through the cross bore 56 in the shaft 54 and then into the sleeve 66 which has been inserted through the housing bore 38. It remains only to line up the shaft and sleeve openings with the casing opening 70 and insert and tighten the cap screw, after which the remainder of the assembly can be completed.

The strength of the reduced diameter of the shaft 58 and of the shaft 54 at the opening 56 are quite adequate, since the bending moment and therefore the bending stress drop to zero at the centers of the shafts. Further, a large part of the load on the pinion 46 is carried by the large-diameter sleeve 66.

Disassembly of the differential will be clear from considering a reversal of the method described above.

I claim:

1. A four-pinion differential having a generally cup-shaped housing adapted to rotate about a drive axis and containing a first pair of diametrically opposed pinions coaxial on a first pinion axis normal to and intersecting the drive axis and a second pair of diametrically opposed pinions coaxial on a second pinion axis normal to and intersecting both the drive and first pinion axes, the housing having pinion-proximate wall portions thereof provided with circular openings respectively on the first and second pinion axes, and means journaling the pinions in the housing, characterized in that said means comprises a first shaft lying on the first pinion axis and passing through the first pair of pinions and into and carried by the proximate pair of circular openings and having a through opening lying on the second pinion axis, said first shaft having substantially a constant diameter, a second integral pinion shaft lying on the second pinion axis and passing through the second pair of pinions and into and carried by the circular openings proximate to the second pair of pinions, said second shaft having a portion of substantially the same diameter as the first shaft and a portion of reduced diameter to pass through the aforesaid through opening, a sleeve passing through one of the second pair of pinions and its proximate circular opening and having inner and outer diameters respectively fitting said reduced portion and of the same diameter as the first shaft, and means securing at least the second pinion shaft to the housing.

2. The invention defined in claims 1, further characterized in that all the circular openings and the pinion openings are of substantially the same diameter and the first shaft is likewise of substantially the same diameter as aforesaid.

3. The invention defined in claim 1, further characterized in that each shaft is of one-piece construction.

4. The invention defined in claim 1, further characterized in that the circular openinged wall portions are integral parts of the housing.

5. The invention defined in claim 1, further characterized in that the securing means engages the sleeve, the associated reduced portion of the second shaft and the proximate portion of the housing.

6. The invention defined in claim 5, further characterized in that the proximate portion of the casing includes a bore normal to the axis of the second shaft, the sleeve includes a bore coaxial with the last-named bore, the second shaft includes at recess aligned with the last-named bore, and a fastener means passes through said last-named bores and into the recesses.

7. The invention defined in claim 6, further characterized in that at least one of the last-named bores is internally threaded and the fastener is threadedly engaged with the threaded bore.

* * * * *